US010438239B1

United States Patent
Milla et al.

(10) Patent No.: US 10,438,239 B1
(45) Date of Patent: Oct. 8, 2019

(54) DIGITAL PROMOTIONS SYSTEM FOR DISPLAYING A DIGITAL PROMOTION BASED UPON PATTERN OF MOVEMENT CONNECTING GRAPHICAL REPRESENTATIONS AND RELATED METHODS

(71) Applicant: INMAR CLEARING, INC., Winston-Salem, NC (US)

(72) Inventors: Horacio G. Milla, Atlanta, GA (US); Steven Goforth, Lakeland, FL (US)

(73) Assignee: INMAR CLEARING, INC., Winston-Salem, NC (US)

( * ) Notice: Subject to any disclaimer, the term of this patent is extended or adjusted under 35 U.S.C. 154(b) by 205 days.

(21) Appl. No.: 15/342,442

(22) Filed: Nov. 3, 2016

(51) Int. Cl.
*G06Q 30/00* (2012.01)
*G06Q 30/02* (2012.01)
*G06F 3/0488* (2013.01)
*G06F 3/0482* (2013.01)
*H04L 29/08* (2006.01)
*H04W 88/02* (2009.01)
*H04B 1/3827* (2015.01)

(52) U.S. Cl.
CPC ....... *G06Q 30/0257* (2013.01); *G06F 3/0482* (2013.01); *G06F 3/04883* (2013.01); *G06Q 30/0267* (2013.01); *H04B 1/3833* (2013.01); *H04L 67/12* (2013.01); *H04W 88/02* (2013.01)

(58) Field of Classification Search
None
See application file for complete search history.

(56) References Cited

U.S. PATENT DOCUMENTS

| 4,101,129 A | * | 7/1978 | Cox | G07F 17/34 463/20 |
| 5,710,886 A | * | 1/1998 | Christensen | G06Q 20/387 705/14.26 |
| 6,035,280 A | * | 3/2000 | Christensen | G06Q 20/387 186/52 |
| 6,361,045 B1 | * | 3/2002 | Bernstein | A63F 9/10 273/157 A |
| 6,536,663 B1 | * | 3/2003 | Lozier | G06Q 20/18 235/379 |

(Continued)

*Primary Examiner* — Michael J Sittner
(74) *Attorney, Agent, or Firm* — Allen, Dyer, Doppelt + Gilchrist, P.A. Attorneys at Law (57) ABSTRACT

A system may include a digital promotions server that includes a processor and a memory coupled thereto for storing digital promotions products each having a respective promotional value associated therewith. The system may also include a mobile wireless communications device that includes a display, an input device, and wireless communications circuitry carried by a portable housing. A controller may be coupled to the wireless communications circuitry and the display and configured to retrieve selected digital promotions from the digital promotions server and display graphical representations each corresponding to one of the selected digital promotions. The controller may also be configured to cooperate with the input device to determine a pattern of movement of a user's finger connecting the graphical representations, and generate a new digital promotion having a promotional value that is greater than a sum of respective promotional values of the connected the graphical representations.

28 Claims, 5 Drawing Sheets

(56) References Cited

U.S. PATENT DOCUMENTS

| | | | | |
|---|---|---|---|---|
| 7,347,364 B2* | 3/2008 | Walker | G06Q 10/06375 | |
| | | | 235/381 | |
| 8,366,544 B2* | 2/2013 | Walker | G06Q 30/02 | |
| | | | 463/29 | |
| 8,550,896 B2* | 10/2013 | Bennett | G07F 17/3244 | |
| | | | 463/16 | |
| 8,671,018 B2* | 3/2014 | Thomas | G06Q 30/02 | |
| | | | 705/14.25 | |
| 8,751,298 B1* | 6/2014 | Giordano | G06Q 30/0226 | |
| | | | 705/14.26 | |
| 8,788,323 B2* | 7/2014 | Weiss | G06Q 30/0224 | |
| | | | 705/14.1 | |
| 9,324,091 B2* | 4/2016 | Randell | H04W 4/21 | |
| 9,324,107 B2* | 4/2016 | Roa | G06Q 30/0643 | |
| 9,361,606 B2* | 6/2016 | Hertel | G06Q 20/02 | |
| 9,471,768 B2* | 10/2016 | Ahmad | G06F 3/04842 | |
| 9,736,148 B2* | 8/2017 | Kotowich | G06F 21/36 | |
| 10,068,265 B2* | 9/2018 | Lenahan | G06Q 30/0226 | |
| 10,095,402 B2* | 10/2018 | Xiao | G06F 3/0416 | |
| 2006/0085256 A1 | 4/2006 | Fleming | | |
| 2009/0259535 A1* | 10/2009 | Chow | G06Q 30/0207 | |
| | | | 705/14.39 | |

\* cited by examiner

DIGITAL PROMOTIONS SYSTEM FOR DISPLAYING A DIGITAL PROMOTION BASED UPON PATTERN OF MOVEMENT CONNECTING GRAPHICAL REPRESENTATIONS AND RELATED METHODS

TECHNICAL FIELD

The present invention relates to the field of electronics, and, more particularly, to the display and processing of digital promotions, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example.

A typical coupon is applicable to a given product and has a redeemable value that may vary based upon the quantity of a given item, size of the product in terms of packaging, and/or the price point of the given item. To have a promotion applied to multiple products, multiple corresponding coupons are generally required to be presented at the POS terminal or digitally clipped. This may be relatively time consuming.

U.S. Patent Application Ser. No. 2006/0085256 to Fleming is directed to a "clip'n win" coupon marketing system. More particularly, Fleming is directed to an integration of a puzzle within a print and/or digital coupon delivery mechanism, or some combination thereof, that motivates the user (or users) to proactively participate in the coupon redemption process due to their motivation to assemble the puzzle and possibly use the puzzle's information to participate in another activity, including but not limited to a contest.

SUMMARY

A digital promotions system may include a digital promotions server that includes a processor and a memory coupled thereto for storing a plurality of digital promotions for a plurality of products. Each digital promotion has a respective promotional value associated therewith. The system may also include a mobile wireless communications device that includes a portable housing, a display carried by the portable housing, and at least one input device carried by the portable housing. The mobile wireless communications device may also include wireless communications circuitry carried by the display, and a controller coupled to the wireless communications circuitry and the display. The controller may be configured to retrieve selected ones of the plurality of digital promotions from the digital promotions server and display a plurality of graphical representations each corresponding to a given one of the selected digital promotions. The controller may also be configured to cooperate with the input device to determine a pattern of movement of a user's finger connecting ones of the plurality of graphical representations, and display a new digital promotion having a promotional value that is greater than a sum of respective promotional values of the connected ones of the plurality of graphical representations. Accordingly, a new digital promotion that has a promotional value that is greater than a sum of respective promotional values of the connected ones of the graphical representations is provided, which may, for example, increase digital promotion processing speed and overall user experience.

The pattern of movement of the user's finger connecting ones of the plurality of graphical representations may include a sequence of discontinuous finger taps associated with respective graphical representations. The pattern of movement of the user's finger connecting ones of the plurality of graphical representations may include a plurality of continuous finger swipe motions connecting the ones of the plurality of graphical representations, for example.

The processor of the digital promotions server may be configured to generate the new digital promotion. Alternatively, the controller of the mobile wireless communications device may be configured to generate the new digital promotion.

The input device may include a touch screen display, for example. The memory may be configured to store a history of previous product purchases for a given user from among a plurality of users, and the new digital promotion may have a promotional value based upon the history of previous product purchases for the given user.

The memory may be configured to store a manufacturer associated with each of the digital promotions, and the new digital promotion may have a promotional value based upon the manufacturer associated with the connected ones of the plurality of graphical representations, for example. The memory may also be configured to store a product category associated with each of the digital promotions, and the new digital promotion may have a promotional value based upon the category associated with the connected ones of the plurality of graphical representations.

The memory may be configured to store a retailer first availability date associated with each of the digital promotions. The new digital promotion may have a promotional value based upon the retailer first availability date associated with the connected ones of the plurality of graphical representations, for example.

The memory may be configured to store a history of previous product purchases for a given user from among a plurality of users. The controller may be configured to retrieve the selected ones of the plurality of digital promotions based upon the history of previous product purchases for the given user, for example. The controller may cooperate with the wireless communications circuitry to wirelessly retrieve the selected ones of the plurality of digital promotions from the digital promotions server.

A method aspect is directed to a method of generating a new digital promotion in a system that includes a digital promotions server. The digital promotions server includes a processor and a memory coupled thereto for storing a plurality of digital promotions for a plurality of products. Each digital promotion may have a respective promotional value associated therewith. The method may include using a mobile wireless communications device to retrieve selected ones of the plurality of digital promotions from the digital promotions server and display a plurality of graphical representations each corresponding to a given one of the selected digital promotions. The method may also include using the mobile wireless communications device to determine a pattern of movement of a user's finger connecting ones of the plurality of graphical representations based upon an input device of the mobile wireless communications device and display the new digital promotion having a promotional value that is greater than a sum of respective promotional values of the connected ones of the plurality of graphical representations.

A non-transitory computer readable medium aspect is directed to a non-transitory computer readable medium that includes computer executable instructions for performing operations of the mobile wireless communications device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
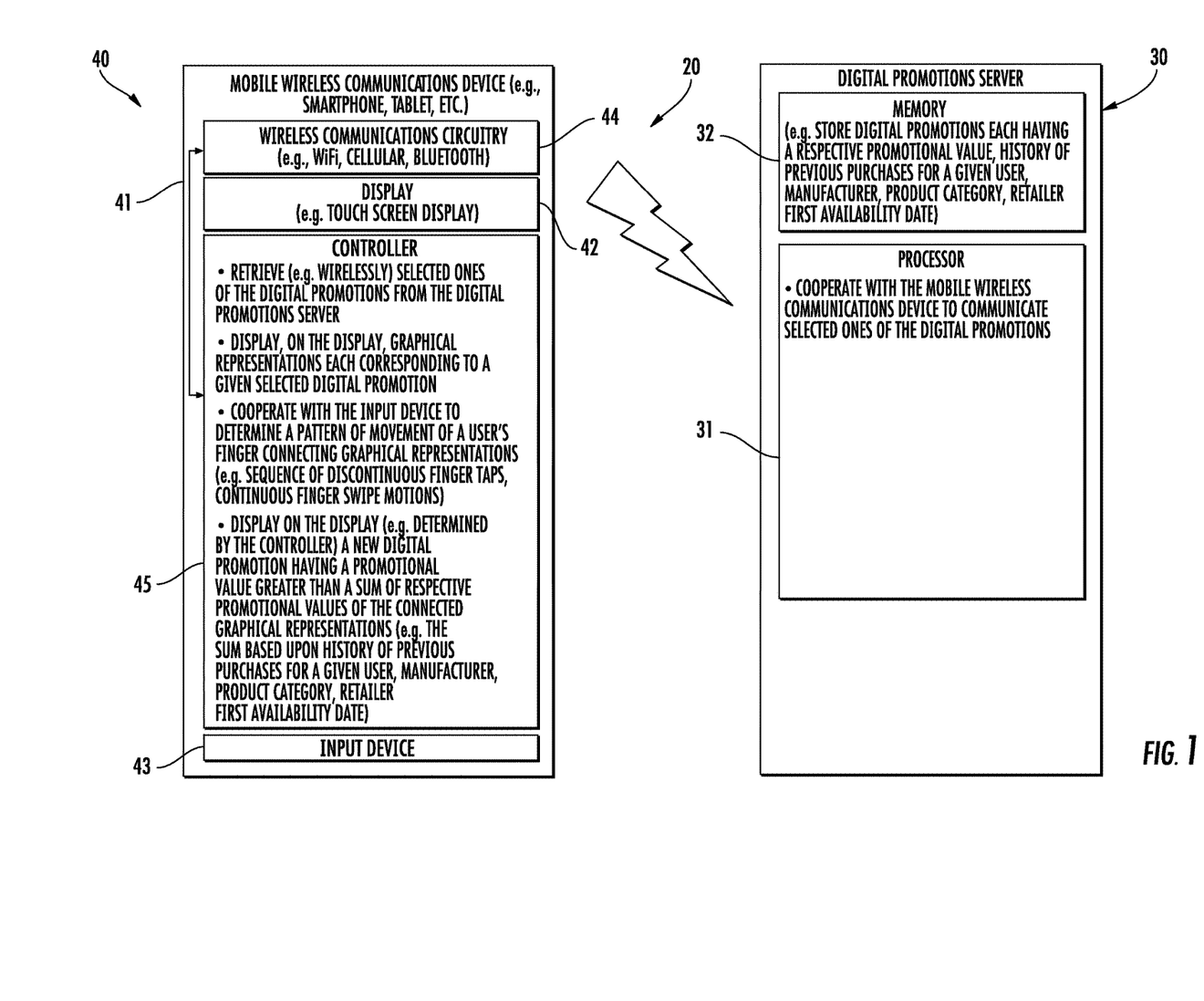
FIG. 1 is schematic block diagram of a system according to an embodiment.
Figure 2:
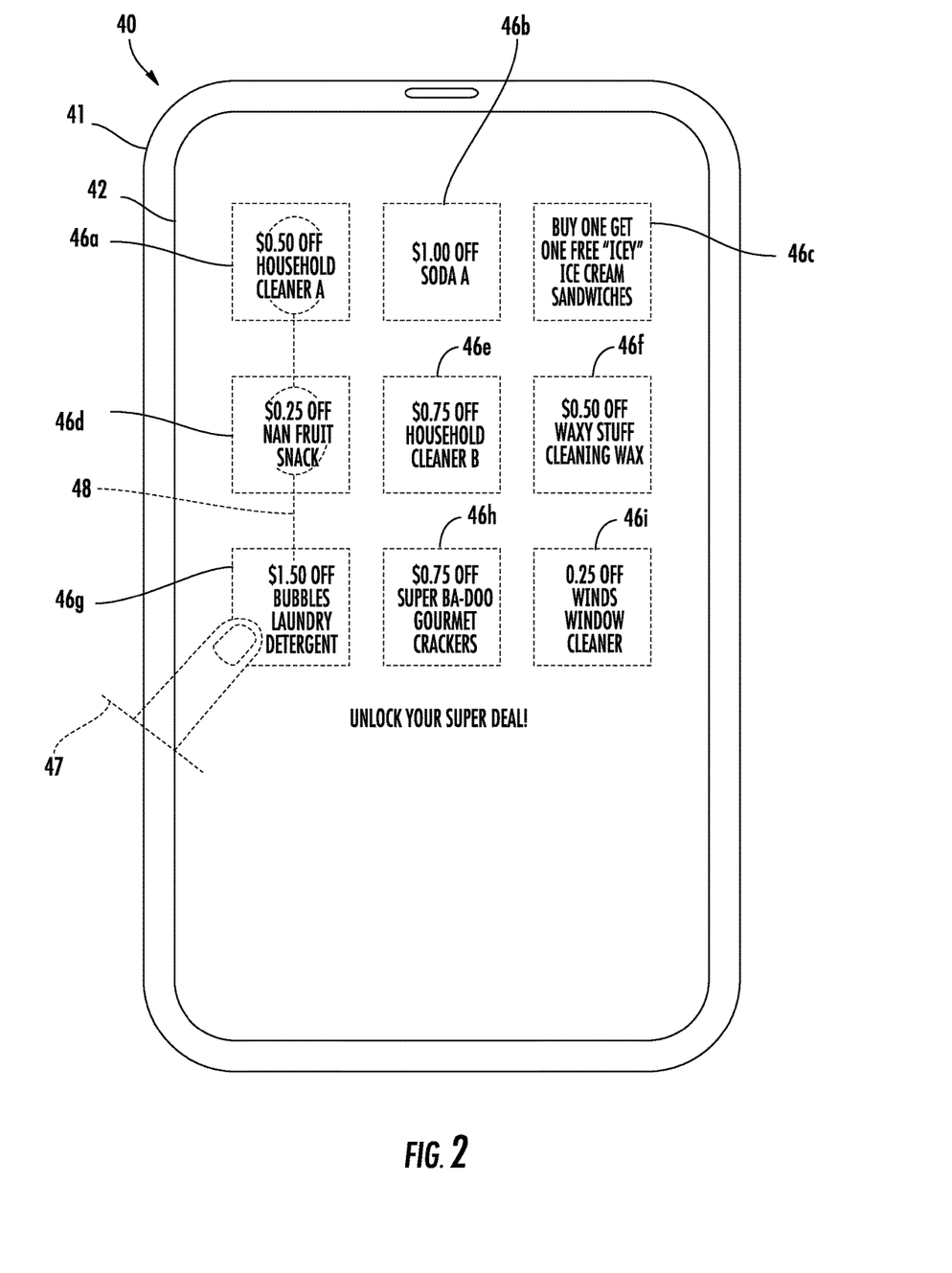
FIG. 2 is a diagram of the mobile wireless communications device of the system of FIG. 1 illustrating graphical representations of digital promotions.
Figure 3:
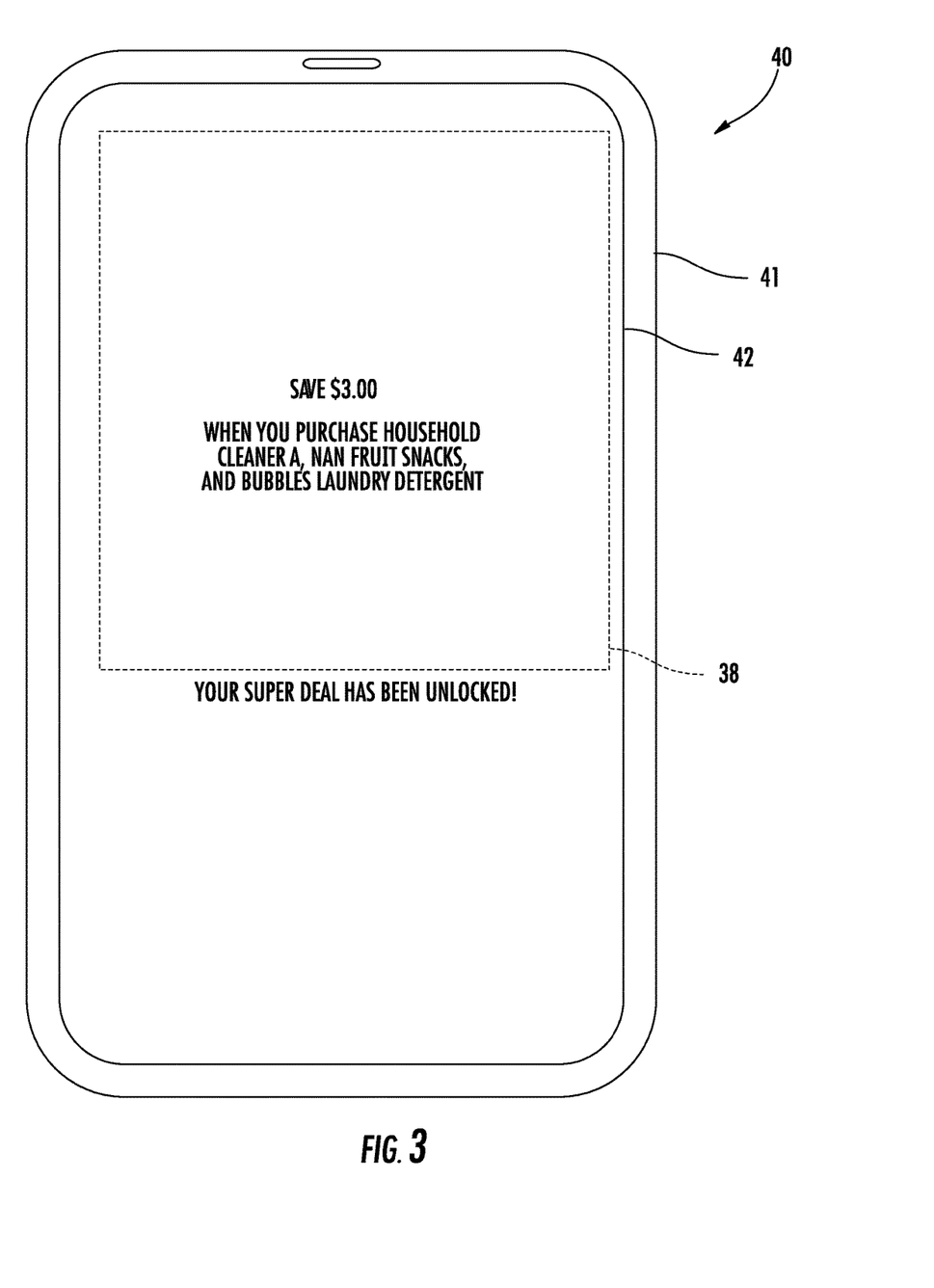
FIG. 3 is a diagram of the mobile wireless communications system of FIG. 1 illustrating a graphical representation of a new promotional offer.

Referring initially to FIGS. 1-3, a system 20 may include a digital promotions server 30. The digital promotions server 30 includes a processor 31 and a memory 32 coupled thereto. The memory 32 stores digital promotions for products. Each digital promotion has a respective promotional value associated therewith. For example, the memory 32 may store a digital promotions for $1.00 off a 12-pack of soda, $0.50 off a gallon of milk, etc. Each digital promotion may have certain attributes associated therewith. For example, stored in the memory 32 and associated with the digital promotion may be a manufacturer, a product category (e.g., beverage, pet product, hair product, etc.), and/or a retailer first availability date (e.g., the date at which the product first became available to a retailer). Of course, other and/or additional attributes may be associated with the digital promotion and may be stored in the memory 32. As will be appreciated by those skilled in the art, the digital promotion may be redeemed by a consumer or user at retailer, for example, at a point-of-sale (POS) terminal during a purchase transaction. The digital promotions server 30 may also be used to process customer or user loyalty program information, for example, user identification data, loyalty data, and basket information (i.e., products being purchased during a purchase transaction at a POS terminal).

The system 20 also includes a mobile wireless communications device 40 that is illustratively in the form of a mobile smart phone. Of course, the mobile wireless communications device 40 may be in the form of other types of electronic devices, for example, tablets, laptop computers, etc. The mobile wireless communications device illustratively includes a portable housing 41, a display 42 carried by the portable housing, and an input device 43 carried by the portable housing. The input device 43 may be part of a touch screen display, for example, as illustrated, and thus the input device 43 may be carried within the display 42, as will be appreciated by those skilled in the art. The input device 43 may be a trackpad, pushbutton, or other input device and/or may be used either alone or in combination with other input devices, for example.

The mobile wireless communications device 40 also includes wireless communications circuitry 44 carried by the portable housing 41. The wireless communications circuitry may be any of short-range and/or long range wireless communications circuitry, for example, WiFi, cellular, Bluetooth, etc.

A controller 45 is coupled to the wireless communications circuitry 44, the display 42, and the input device 43. The controller 45 wirelessly retrieves selected digital promotions from the digital promotions server 30. The digital promotions retrieved from the digital promotions server 30 may be selected based upon currently available digital promotions, for example, that would typically appear in a weekly advertisement, for a given retailer and/or manufacturer. The digital promotions retrieved from the digital promotions server 30 may also be selected based upon a user's shopping history, shopping profile or preferences, etc., for example, based upon a user's identifier and/or where the digital promotions server also functions to process loyalty program data. Of course, the digital promotions retrieved from the digital promotions server 30 may be selected based upon other and/or additional criteria.

The controller 45 displays graphical representations 46a-46i on the display 42. The graphical representations 46a-46i each correspond to a given one of the selected digital promotions. For example, each graphical representation may be an image of a corresponding coupon or digital promotion identifying the product and the promotional value. Of course, each graphical representation 46a-46i may be another type of graphic, for example, an icon, and may include other and/or additional information.

The controller 45 cooperates with the input device 43 to determine a pattern of movement 48 of a user's finger 47 connecting the graphical representations. The pattern of movement 48 of the user's finger 47 may be a sequence of discontinuous finger taps associated with respective ones of the graphical representations 46a-46i. In other words, when the display 42 is in the form of a touch screen display, the user may "tap" or touch single graphical representations 46a-46i in a sequence with the user removing his finger 47 from the input device 43 between "taps" (FIG. 2).

Figure 4:
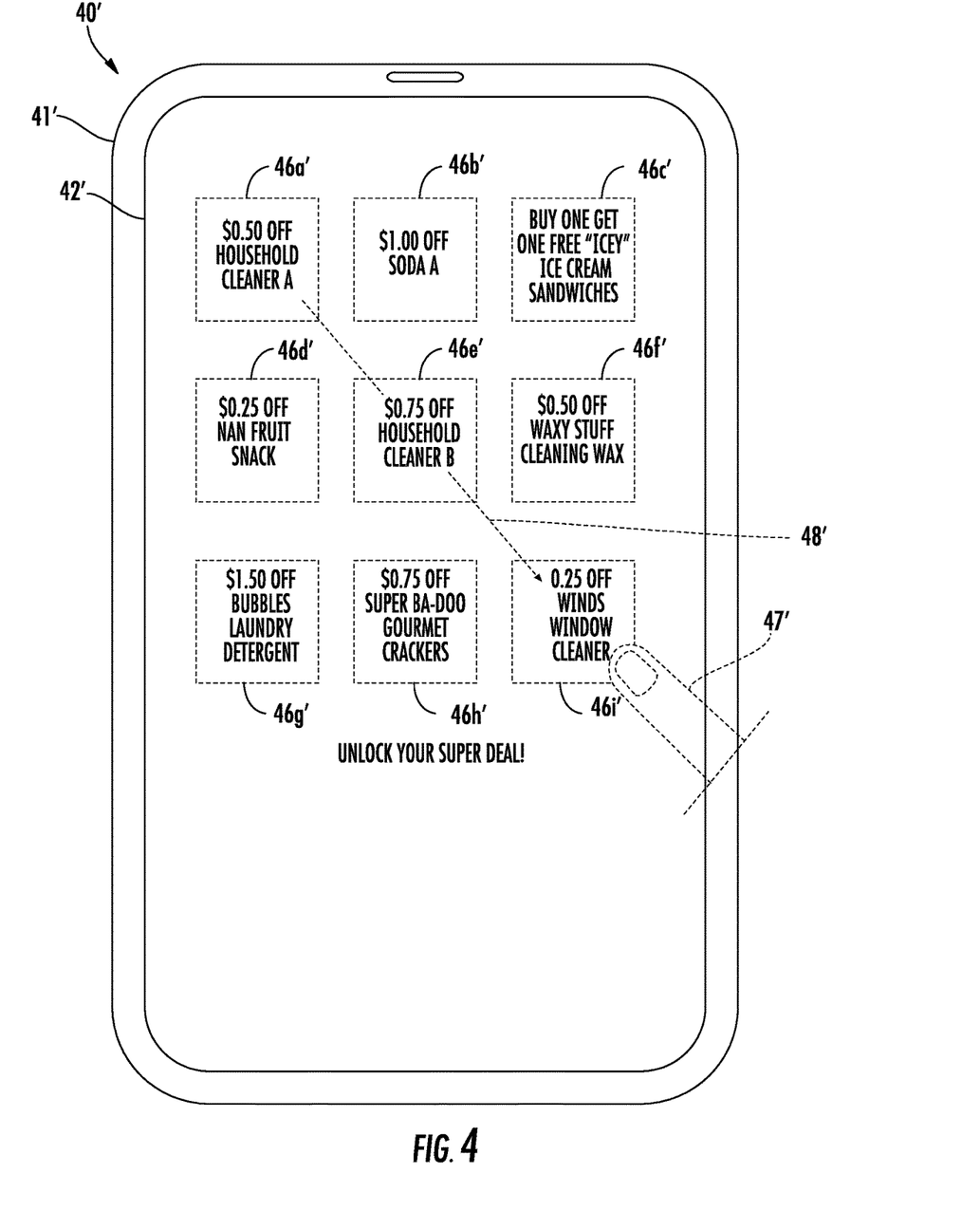
FIG. 4 is diagram of the mobile wireless communications device illustrating graphical representations of digital promotions in accordance with another embodiment.

Referring briefly to FIG. 4, the pattern of movement of the user's finger 47' may also include continuous finger swipe motions connecting the graphical representations 46a'-46i'. More particularly, the pattern of movement may be conceptually considered a "connect the dots" of the graphical representations 46a'-46i', whereby the user's finger remains in contact with the input device 43'. The pattern of movement of the user's finger 47' may include other and/or additional patterns of movement, as will be appreciated by those skilled in the art.

Referring additionally to FIG. 3, the controller 45 generates and displays, for example, on the display 42 and based upon the pattern of movement 48 of the user's finger 47, a new digital promotion having a promotional value that is greater than a sum of respective promotional values of the connected ones graphical representations 46a-46i. More particularly, the controller 45 may generate or determine the new digital promotion based upon communications with the digital promotions server 30, for example, based upon the respective data stored in the memory 32. In this case, the controller 45 cooperates with wireless communications circuitry 44 to communicate with, and more particularly, read data from the memory 32 of the digital promotions server 40 for determining or generating and displaying the new digital promotion 38.

The new digital promotion 38 may be displayed as a new graphical representation 38 on the display 42. In other words, a given pattern of movement connecting, for example, three graphical representations across a left column may yield a new digital promotion having a first promotional value that exceeds the sum of the three digital promotions associated with the three graphical representations individually (FIGS. 2 and 3).

A different pattern of movement, for example, connecting three graphical representations diagonally from the upper left (FIG. 4) to the lower right may yield a new digital promotion having a second different promotional value that exceeds the sum of the three digital promotions associated with the three graphical representations individually. Connecting a fourth or fifth graphical representation also changes the promotional value of the new digital promotion. In other words, the promotional value of the new digital promotion may change based upon how many graphical representations are connected, the value of the digital promotions associated with the connected graphical representations, and/or the type or direction of finger pattern.

Other factors may also contribute to promotional value of the new digital promotion. The new digital promotion may have a promotional value based upon the history of previous product purchases for the given user. For example, if the given user generally purchases a given product on a regular recurring basis, the promotional value of the new digital promotion may be lowered. The new digital promotion may have a promotional value based upon the manufacturer associated with the connected graphical representations. For example, if the connected graphical representations are all associated with a same manufacturer, the promotional value of the new digital promotion may be increased.

The new digital promotion may have a promotional value based upon the category associated with the connected graphical representations. In other words, if the connected graphical representations are all for household cleaning products (FIG. 3), the promotional value of the new digital promotion may be increased, for example, by a certain factor.

The new digital promotion may also have a promotional value based upon the retailer first availability date associated with the graphical representations. In other words, if the connected graphical representations are associated with "newer" products for a retailer (e.g., on the market since), the promotional value of the new digital promotion may be increased, for example, so as to be more aggressive with newer products, as will be appreciated by those skilled in the art.

Any number of factors may contribute to the promotional value of the new digital promotion. Of course, other factors may also be included. The amounts and weighting of any one factor or factors may be determined based upon a given promotional program or budget, for example, determined by the manufacturer in accordance with specific guidelines. In any event the promotional value of the new digital promotion is greater than the sum of the respective promotional values of the connected ones graphical representations 46a-46i.

Figure 5:
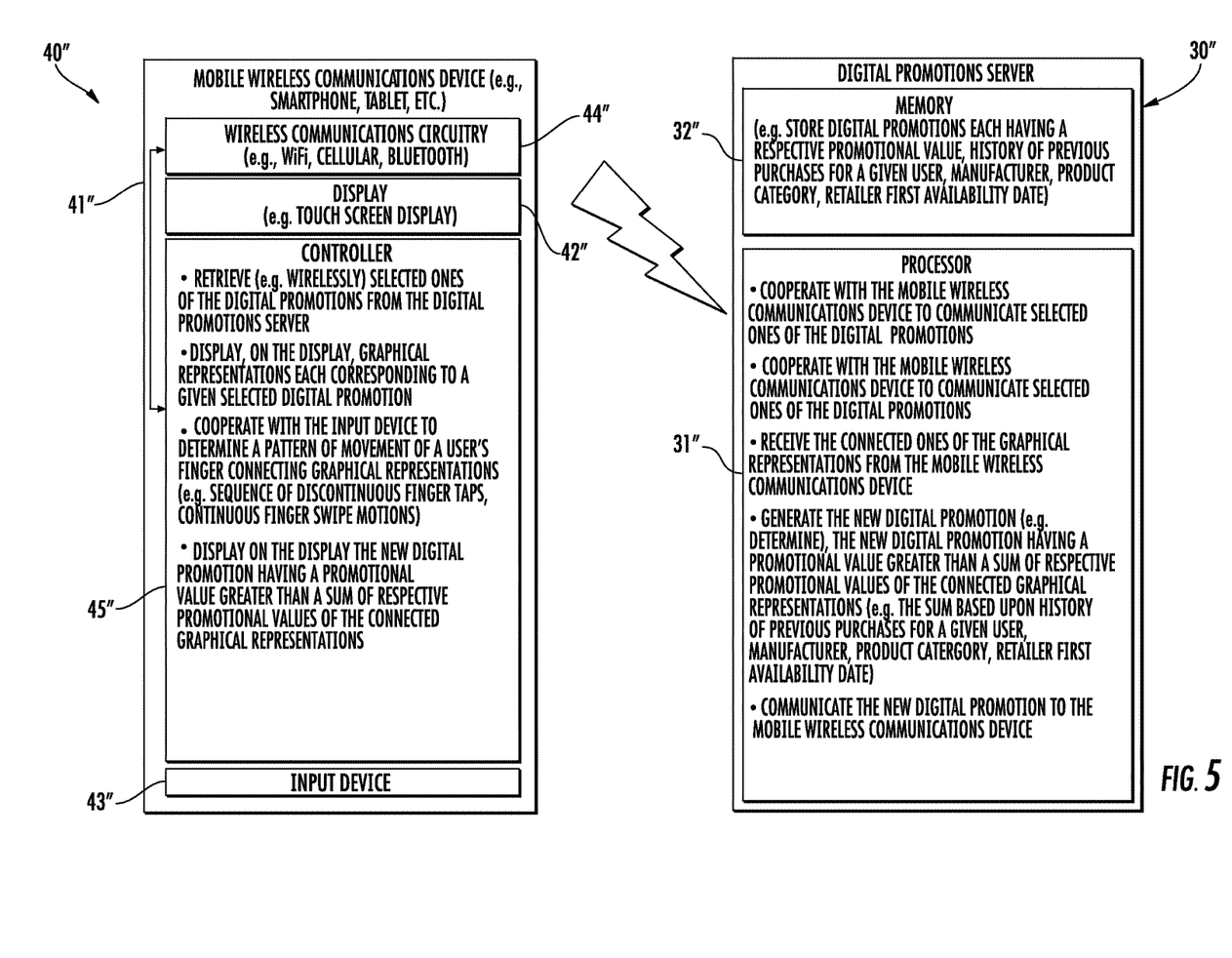
FIG. 5 is schematic block diagram of a system according to another embodiment.

Referring now to FIG. 5, alternatively, the digital promotions server 30", via the processor 31", may generate or determine the new digital promotion, including its respective promotional value, based upon the respective data stored in the memory 32", and communicate the new digital promotion including the promotional value, for example, wirelessly, to the mobile wireless communications device 40". In this case, the mobile wireless communications device 40" communicates, for example, wirelessly, data corresponding to the pattern of movement of the user's finger 47" and the connected graphical representations (i.e., which digital promotions were selected by the pattern of movement) to the digital promotions server 30". The digital promotions server 30" then determines the promotional value of the new digital promotion or generates the new digital promotion, and communicates with the mobile wireless communications device 40" so that the mobile wireless communications device displays the new digital promotion.

As will be appreciated by those skilled in the art, by displaying connectable graphical representations of digital promotions, the overall user experience may be improved and the speed at which the user can select the digital promotions may be increased. With respect to the speed at which digital promotions are processed, the claimed system may increase digital promotion processing speed by reducing the number individual or standalone digital promotions into a single new digital promotion. In other words, a single new digital promotion is processed as opposed to three, four, five, or more individual digital promotions. By packaging the data as a single new digital promotion, the speed at which the digital promotion is processed, for example, at the digital promotions server 30, redeemed at a POS terminal, and/or saved to a digital wallet (e.g. on the digital promotions server), may be increased, as less data is processed. The user may also benefit from the speed and the promotional value of the new digital promotion being greater than a sum of the digital promotions associated with the graphical representations individually.

A method aspect is directed to a method of generating a new digital promotion in a system 20 that includes a digital promotions server 30 that includes a processor 31 and a memory 32 coupled thereto for storing digital promotions for products, wherein each digital promotion has a respective promotional value associated therewith. The method includes using a mobile wireless communications device 40 to retrieve selected ones of the digital promotions from the digital promotions server 30 and display graphical representations 46a-46i each corresponding to a given one of the selected digital promotions. The method also includes using the mobile wireless communications device 40 to determine a pattern of movement 48 of a user's finger 47 connecting ones of the graphical representations based upon an input device 43 of the mobile wireless communications device, and display the new digital promotion having a promotional value that is greater than a sum of respective promotional values of the connected ones of the plurality of graphical representations. Moreover, the techniques described herein by which the user selects the graphical representations is a form of data packaging in a user interface that permits quicker selection of multiple digital promotions and also may be considered gamification of the digital promotion selection process as the promotional value of the new digital promotion has a sum that is not known until the user selection.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotions system comprising:
   a digital promotions server comprising a processor and a memory coupled thereto for storing a plurality of digital promotions for a plurality of products, each digital promotion having a respective promotional value associated therewith; and
   a mobile wireless communications device comprising
      a portable housing,
      a display carried by said portable housing,
      at least one input device carried by said portable housing,
      wireless communications circuitry carried by said portable housing, and
      a controller coupled to said wireless communications circuitry and said display, said controller configured to
         retrieve selected ones of the plurality of digital promotions from said digital promotions server,
         display a plurality of graphical representations each corresponding to a given one of the selected digital promotions,
         cooperate with said input device to determine a pattern of movement of a user's finger connecting ones of the plurality of graphical representations, the pattern of movement comprising a permutation of the connected ones of the plurality of graphical representations, and
         send the determined pattern of movement to said digital promotions server;
   said processor of said digital promotions server configured to, upon receiving the determined pattern of movement,
      determine a new digital promotion having a promotional value that is greater than a sum of respective promotional values of the connected ones of the plurality of graphical representations, an amount by which the promotional value is greater than the sum being based upon the determined pattern of movement including the permutation of the connected ones of the plurality of graphical representations, and
      communicate the new digital promotion to said mobile wireless communications device;
   said controller of said mobile wireless communications device configured to
      receive the communicated new digital promotion from said digital promotions server, and
      display on said display the new digital promotion received from said digital promotion server.

2. The digital promotions system of claim 1 wherein the determined pattern of movement of the user's finger connecting ones of the plurality of graphical representations is further based upon a sequence of discontinuous finger taps from the user's finger, via said at least one input device carried by said portable housing, while connecting the ones of the plurality of graphical representations.

3. The digital promotions system of claim 1 wherein the determined pattern of movement of the user's finger connecting ones of the plurality of graphical representations is further based upon a plurality of continuous finger swipe motions from the user's finger, via said at least one input device carried by said portable housing, while connecting the ones of the plurality of graphical representations.

4. The digital promotions system of claim 1 wherein said input device comprises a touch screen display.

5. The digital promotions system of claim 1 wherein said memory is configured to store a history of previous product purchases for a given user from among a plurality of users; and wherein the promotional value of the new digital promotion is further based upon the history of previous product purchases for the given user.

6. The digital promotions system of claim 1 wherein said memory is configured to store a manufacturer associated with each of the digital promotions; and wherein the promotional value of the new digital promotion is further based upon each manufacturer associated with the connected ones of the plurality of graphical representations.

7. The digital promotions system of claim 1 wherein said memory is configured to store a product category associated with each of the digital promotions; and wherein the promotional value of the new digital promotion is further based upon each category associated with the connected ones of the plurality of graphical representations.

8. The digital promotions system of claim 1 wherein said memory is configured to store a retailer first availability date associated with each of the digital promotions; and wherein the promotional value of the new digital promotion is further based upon each retailer first availability date associated with the connected ones of the plurality of graphical representations.

9. The digital promotions system of claim 1 wherein said memory is configured to store a history of previous product purchases for a given user from among a plurality of users; and wherein said processor is configured to determine, based upon the history of previous product purchases for the given user, which of the plurality of digital promotions are included in the selected ones of the plurality of digital promotions.

10. The digital promotions system of claim 1 wherein said controller cooperates with said wireless communications circuitry to wirelessly retrieve the selected ones of the plurality of digital promotions from said digital promotions server.

11. A digital promotions server comprising:
   a memory for storing a plurality of digital promotions for a plurality of products, each digital promotion having a respective promotional value associated therewith; and
   a processor coupled to said memory and configured to
      communicate selected ones of the plurality of digital promotions to a mobile wireless communications device, the mobile wireless communications device displaying a plurality of graphical representations each corresponding to a given one of the selected digital promotions and the mobile wireless communications device determining a pattern of movement of a user's finger connecting ones of the plurality of graphical representations, the pattern of movement comprising a permutation of the connected ones of the plurality of graphical representations,
      receive the determined pattern of movement from the mobile wireless communications device, p2 determine a new digital promotion based upon the determined pattern of movement, the new digital promotion having a promotional value that is greater than a sum of respective promotional values of the connected ones of the plurality of graphical representations, an amount by which the promotional value is greater than the sum being based upon the determined pattern of movement including the permutation of the connected ones of the plurality of graphical representations, and communicate the new digital promotion to the mobile wireless communications device.

12. The digital promotions server of claim 11 wherein said memory is configured to store a history of previous product purchases for a given user from among a plurality of users; and wherein the promotional value of the new digital promotion is further based upon the history of previous product purchases for the given user.

13. The digital promotions server of claim 11 wherein said memory is configured to store a manufacturer associated with each of the digital promotions; and wherein the promotional value of the new digital promotion is further based upon each manufacturer associated with the connected ones of the plurality of graphical representations.

14. The digital promotions server of claim 11 wherein said memory is configured to store a product category associated with each of the digital promotions; and wherein the promotional value of the new digital promotion is further based upon each category associated with the connected ones of the plurality of graphical representations.

15. The digital promotions server of claim 11 wherein said memory is configured to store a retailer first availability date associated with each of the digital promotions; and wherein the promotional value of the new digital promotion is further based upon each retailer first availability date associated with the connected ones of the plurality of graphical representations.

16. The digital promotions server of claim 11 wherein said memory is configured to store a history of previous product purchases for a given user from among a plurality of users; and wherein said processor is configured to determine, based upon the history of previous product purchases for the given user, which of the plurality of digital promotions are included in the selected ones of the plurality of digital promotions.

17. A method of processing a new digital promotion comprising:

communicating, by a digital promotions server comprising a memory storing a plurality of digital promotions for a plurality of products, each digital promotion having a respective promotional value associated therewith, selected ones of the plurality of digital promotions to a mobile wireless communications device;

displaying, by the mobile wireless communications device, a plurality of graphical representations each corresponding to a given one of the selected digital promotions;

determining, by the mobile wireless communications device, a pattern of movement of a user's finger connecting ones of the plurality of graphical representations, the pattern of movement comprising a permutation of the connected ones of the plurality of graphical representations;

receiving, at the digital promotions server, from the mobile wireless communications device, the determined pattern of movement;

determining, by the digital promotions server, the new digital promotion based upon the determined pattern of movement, the new digital promotion having a promotional value that is greater than a sum of respective promotional values of the connected ones of the plurality of graphical representations, an amount by which the promotional value is greater than the sum being based upon the determined pattern of movement including the permutation of the connected ones of the plurality of graphical representations; and communicating the new digital promotion to the mobile wireless communications device.

18. The method of claim 17 wherein the determining, by the mobile wireless communications device, the pattern of movement of the user's finger connecting the ones of the plurality of graphical representations, is further based upon a sequence of discontinuous finger taps made by the user via a user interface of the mobile wireless communications device while connecting ones of the plurality of graphical representations.

19. The method of claim 17 wherein the determining, by the mobile wireless communications device, the pattern of movement of the user's finger connecting the ones of the plurality of graphical representations, is further based upon a plurality of continuous finger swipe motions made by the user via a user interface of the mobile wireless communications device while connecting the ones of the plurality of graphical representations.

20. The method of claim 17 wherein the memory is configured to store a history of previous product purchases for a given user from among a plurality of users; and wherein using the promotional value of the new digital promotion is further based upon the history of previous product purchases for the given user.

21. The method of claim 17 wherein the memory is configured to store a manufacturer associated with each of the digital promotions; and wherein the promotional value of the new digital promotion is further based upon each manufacturer associated with the connected ones of the plurality of graphical representations.

22. The method of claim 17 wherein the memory is configured to store a product category associated with each of the digital promotions; and wherein the promotional value of the new digital promotion is further based upon each category associated with the connected ones of the plurality of graphical representations.

23. The method of claim 17 wherein the memory is configured to store a retailer first availability date associated with each of the digital promotions; and wherein the promotional value of the new digital promotion is further based upon each retailer first availability date associated with the connected ones of the plurality of graphical representations.

24. The method of claim 17 wherein the memory is configured to store a history of previous product purchases for a given user from among a plurality of users; and further comprising, determining, by the digital promotions server, based upon the history of previous product purchases for the given user, which of the plurality of digital promotions are included in the selected ones of the plurality of digital promotions.

25. A non-transitory computer readable medium for processing a new digital promotion, the non-transitory computer readable medium storing computer executable instructions that when executed by a processor of a digital promotions server cause the processor of the digital promotions server to perform operations comprising:

communicating selected ones of a plurality of digital promotions to a mobile wireless communications device, the mobile wireless communications device, upon receiving the communicated selected ones of the plurality of digital promotions, displaying a plurality of graphical representations each corresponding to a given one of the selected digital promotions, and the mobile wireless communications device determining a pattern of movement of a user's finger connecting ones of the plurality of graphical representations and communicating the determined pattern of movement to the digital promotions server, the pattern of movement comprising a permutation of the connected ones of the plurality of graphical representations;

receiving the determined pattern of movement from the mobile wireless communications device;

determining the new digital promotion based upon the determined pattern of movement, the new digital promotion having a promotional value that is greater than a sum of respective promotional values of the connected ones of the plurality of graphical representations, an amount by which the promotional value is greater than the sum being based upon the determined pattern of movement including the permutation of the connected ones of the plurality of graphical representations; and communicating the new digital promotion to the mobile wireless communications device.

26. The non-transitory computer readable medium of claim 25 wherein the determining, by the mobile wireless communications device, the pattern of movement of the user's finger connecting ones of the plurality of graphical representations is further based upon a sequence of discontinuous finger taps associated with respective graphical representations made by the user's finger via a user interface of the mobile wireless communications device.

27. The non-transitory computer readable medium of claim 25 wherein the determining, by the mobile wireless communications device, the pattern of movement of the user's finger connecting ones of the plurality of graphical representations is further based upon a plurality of continuous finger swipe motions made by the user's finger via a user interface of the mobile wireless communications device while connecting the ones of the plurality of graphical representations.

28. The non-transitory computer readable medium of claim 25 wherein the computer executable instructions cause the processor to generate the new digital promotion.

* * * * *

UNITED STATES PATENT AND TRADEMARK OFFICE
CERTIFICATE OF CORRECTION

PATENT NO. : 10,438,239 B1  
APPLICATION NO. : 15/342442  
DATED : October 8, 2019  
INVENTOR(S) : Milla et al.

Page 1 of 1

It is certified that error appears in the above-identified patent and that said Letters Patent is hereby corrected as shown below:

On the Title Page

Item (57)  Delete the entire Abstract  
Insert the following Abstract: --A system may include a digital promotions server that includes a processor and a memory coupled thereto for storing digital promotions products each having a respective promotional value associated therewith. The system may also include a mobile wireless communications device that includes a display, an input device, and wireless communications circuitry carried by a portable housing. A controller may be coupled to the wireless communications circuitry and the display and configured to retrieve selected digital promotions from the digital promotions server and display graphical representations each corresponding to one of the selected digital promotions. The controller may also be configured to cooperate with the input device to determine a pattern of movement of a user's finger connecting the graphical representations, and generate a new digital promotion having a promotional value that is greater than a sum of respective promotional values of the connected graphical representations.--

In the Claims

Column 8, Line 62, Claim 11  Delete: "p2"

Signed and Sealed this  
Twenty-sixth Day of November, 2019

Andrei Iancu  
*Director of the United States Patent and Trademark Office*